US008171951B2

(12) United States Patent
Quendt et al.

(10) Patent No.: US 8,171,951 B2
(45) Date of Patent: May 8, 2012

(54) VALVE WITH AN AND-FUNCTION

(75) Inventors: Volker Quendt, Unterensingen (DE); Tobias Danner, Ostfildern (DE)

(73) Assignee: Festo AG & Co. KG, Esslingen (DE)

( * ) Notice: Subject to any disclaimer, the term of this patent is extended or adjusted under 35 U.S.C. 154(b) by 632 days.

(21) Appl. No.: 12/311,612

(22) PCT Filed: Jun. 30, 2007

(86) PCT No.: PCT/EP2007/005821
§ 371 (c)(1),
(2), (4) Date: Apr. 6, 2009

(87) PCT Pub. No.: WO2009/003500
PCT Pub. Date: Jan. 8, 2009

(65) Prior Publication Data
US 2010/0032036 A1     Feb. 11, 2010

(51) Int. Cl.
*G05D 11/03*     (2006.01)
(52) U.S. Cl. .......................... 137/112; 137/111; 137/114
(58) Field of Classification Search .................. 137/111, 137/112, 113, 114, 513, 614.21; 60/430
See application file for complete search history.

(56) References Cited

U.S. PATENT DOCUMENTS

| | | | | | |
|---|---|---|---|---|---|
| 2,634,743 | A | * | 4/1953 | Audemar | 137/112 |
| 2,774,369 | A | * | 12/1956 | Di Tirro | 137/102 |
| 3,145,723 | A | * | 8/1964 | Chorkey | 137/112 |
| 3,308,817 | A | * | 3/1967 | Seeler | 128/203.25 |
| 3,550,611 | A | * | 12/1970 | Baatrup | 137/111 |
| 4,463,775 | A | * | 8/1984 | Wittren | 137/111 |
| 4,759,261 | A | * | 7/1988 | Flieter | 91/420 |
| 5,850,844 | A | * | 12/1998 | Iversen | 137/111 |
| 7,121,266 | B2 | * | 10/2006 | Powell | 123/509 |

FOREIGN PATENT DOCUMENTS

| | | |
|---|---|---|
| DE | 2251963 | 4/1974 |
| DE | 20014697 | 1/2001 |
| FR | 1585127 | 1/1970 |
| GB | 982016 | 2/1965 |

* cited by examiner

*Primary Examiner* — Stephen M Hepperle
*Assistant Examiner* — Kevin Murphy
(74) *Attorney, Agent, or Firm* — Hoffman & Baron, LLP

(57) ABSTRACT

A valve (1) with a AND gate function has a valve member (2) cooperating with moving passage members (23a and 23b) in a valve housing (3) in order to control connections between one outlet (A) and two inlets (E1 and E2). If the pressure difference present at the input side goes above a threshold value, the valve member (2) can thrust back one of the passage members (23a and 23b) against the stressing force of the stressing means (34a and 34b) in order to separate the outlet (A) simultaneously from both inlets (E1 and E2). Accordingly a safety and/or a logic function may be implemented.

20 Claims, 3 Drawing Sheets

VALVE WITH AN AND-FUNCTION

This application claims priority based on an International Application filed under the Patent Cooperation Treaty, PCT/EP2007/005821, filed Jun. 30, 2007.

BACKGROUND OF THE INVENTION

The invention relates to a valve with an AND gate function in the case of which a valve member able to be shifted in relation to a valve housing controls the fluid connection between two inlets and an outlet, its switching position being dependent on the pressure difference between the fluid pressure obtaining at the two inlets so that at equal input pressures at least one inlet is joined with the outlet, and the valve member can assume two opposite terminal positions in which it clears one of two first passages stationary arranged in the housing and connected with the outlet and simultaneously shuts off the other first passage.

A valve having these features is disclosed in the product catalog entitled "Der Pneumatic-Katalog 97/98", issue of 97/98, thirty-third edition, Festo AG & Co., page 11.5/10-2. This valve possesses one outlet and two inlets, the outlet always being subject to pressure, when both inlets are simultaneously supplied with a fluid pressure. In the case of identical pressures the switching position is indifferent and the outlet is connected only with one or simultaneously with both inlets. If at the inlet there is a pressure difference, then only the lower pressure will appear at the outlet.

The same product catalog mentions an OR gate valve on page 11.5/10-1, which also possesses two inlets and one outlet. In this case higher of the two inlet pressures always arrives at the outlet. The inlet supplied with the lower pressure is shut off.

The German patent publication DE 22 51 963 A discloses a logical valve gate with an inlet and two outlets. In this case the pressure medium flowing in through the permanently open inlet is alternatingly let off through the two outlets, a change over always taking place when the input pressure returns to zero or is reduced by a predetermined amount.

In safety related fluid power circuits, where safety plays a substantial role, there may be a requirement to supply a load simultaneously at all times from two pressure source and to shut off the supply for reasons of safety, when one of the two pressures falls below a certain threshold, for example because of a leak occurring. There is consequently a requirement for a fluid power circuit, which unlike the above mentioned known AND valve, separates a load completely from the pressure supply, when on the inlet side a certain pressure difference occurs.

SUMMARY OF THE INVENTION

Accordingly one aim of the present invention is to provide measures to separate an outlet completely from the fluid supply when there is an excessive pressure difference on the inlet side.

This object is to be attained in the case of a valve having the initially mentioned features because two second passages, connected with respectively one of the two inlets, are present which are respectively a component of one of two passage members adapted to move in relation to the valve housing in the actuating direction of the valve member, such passage members being so biased by stressing means independently of one another in a yielding manner into a home position that the valve member prior to reaching its terminal positions can bear, dependent on its actuation direction, on the one or other passage member and thereby can close its second passage so that the associated inlet is separated from the outlet, the level of the stressing force defining a threshold value for the inlet pressure difference, and on the threshold value being exceeded the valve member can force back the passage member, which is stressed and closed by it in order to shift into one of the terminal positions and accordingly to separate both inlets from the outlet.

The valve in accordance with the invention allows flow through of a pressure medium to the outlet when the same input pressure obtains at the two inlets. Should the flow through member at the inlet side exceed a threshold value defined by the stressing means, the outlet is separated from the two inlets. This takes place because the valve member on the one hand closes the first passage in the housing associated with the one inlet and on the other hand at the same time closes the second passage (associated with the other inlet) at one of the movable passage members. As long as there is a pressure difference on the inlet side not exceeding the predetermined limiting value, the valve member will separate, by cooperation with the corresponding passage member, only the inlet which is at the lower input pressure, with the result that the outlet will continue to be supplied from the other inlet with the higher input pressure.

The valve may for example be employed as a safety valve, it performing a logic function and produces a signal at the outlet only as long as a certain pressure difference is not exceeded. The valve may for example also be utilized to govern the synchronization of two control valves placed upstream from the two inlets. An output is then only produced when the two control valves produce pressure signals with the same level within a predetermined tolerance range.

Advantageous further developments of the invention are recited in the dependent claims.

It is preferred for the two first passages to be each provided with a first valve seat (having a first sealing face opposite it) arranged on the housing. In the two terminal positions the respectively one first passage is shut off, since the first sealing face opposite it engages its valve seat. The other first passage is in this case open, but despite this no fluid flows through it, because simultaneously the second passage, arranged on the associated passage member, is shut off.

Preferably one respective first sealing face and one second sealing face are disposed in pairs on two spaced apart closure member disk of the valve member.

The passages are more particularly so arranged that respectively one first passage in the housing and one second passage arranged in a passage member are placed in series for fluid-flow.

The home position of the passage members is preferably respectively defined by an abutment face disposed on the valve housing against which the associated passage member is thrust by the stressing means.

Preferably the valve member is placed in the actuating direction axially between the two passage members, i.e. it is preferably flanked on axially opposite sides by same.

The passage members are preferably circular in design with the formation of an associated second passage. They can be mounted in a sliding fashion like a piston on the valve housing. Preferably they are arranged coaxially in relation to the valve member.

Each passage member preferably bears a seal at which it is in constant sealing contact with the valve housing while allowing its sliding movement. In order to avoid having a dynamic seal it is possible in the alternative it is also possible to provide a respectively statically mounted membrane on the passage member and on the housing as a sealing element.

The stressing means are preferably in the form of a compression spring means, in particular of a mechanical kind. However it would also be possible to have gas spring and more particularly a pneumatic spring.

BRIEF DESCRIPTION OF THE DRAWINGS

In the following the invention will be explained in detail with reference to the accompanying drawings. In longitudinal section they show a preferred embodiment of the valve having an AND gate function in various different positions of switching.

DETAILED DESCRIPTION OF THE PREFERRED EMBODIMENTS

Figure 1:
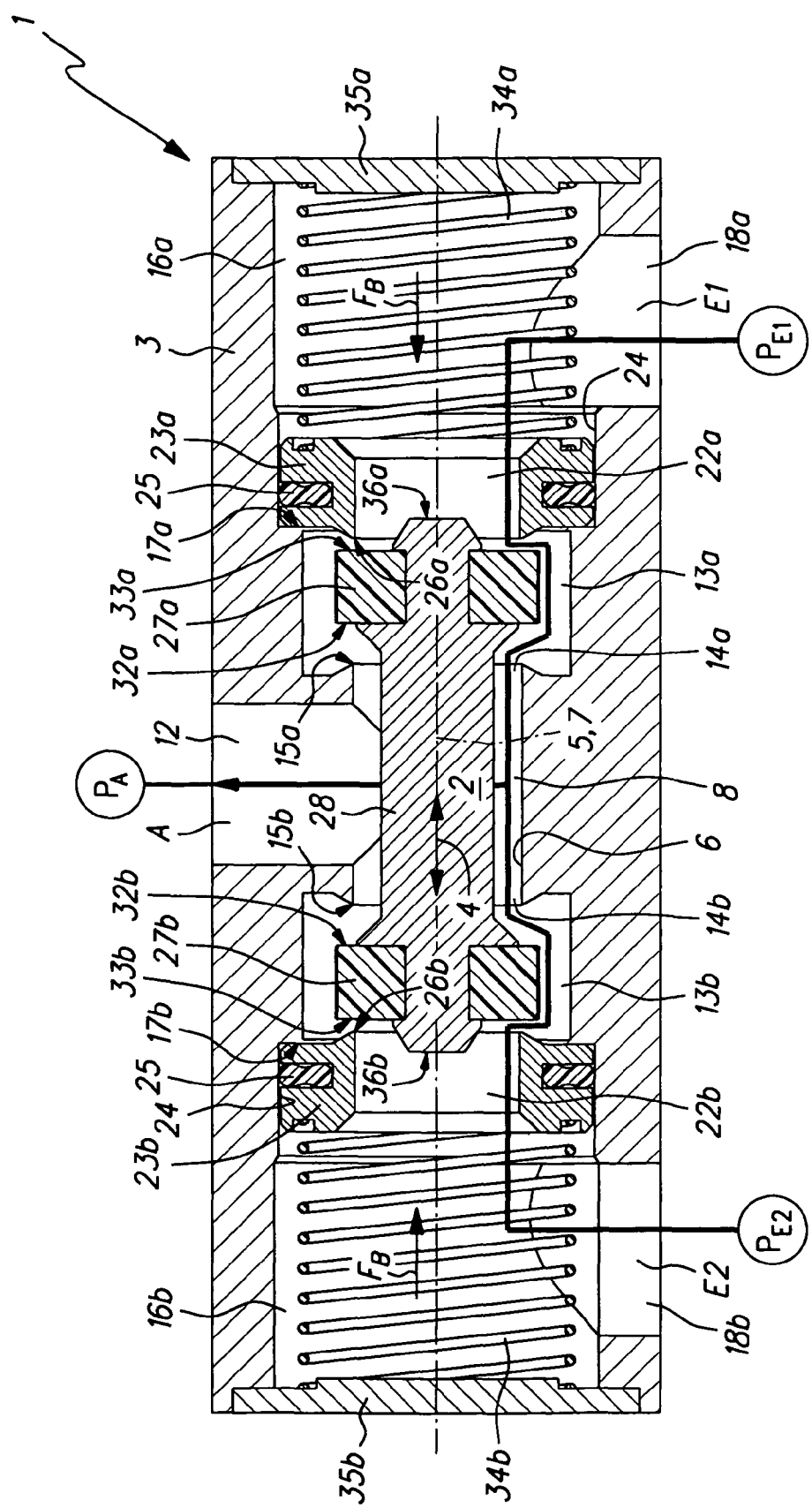
FIG. 1 shows the valve in a switching state simultaneously connecting both inlets with the outlet.

The valve generally referenced 1 is designed in the form of a spool valve and possesses an elongated slide-like valve member 2, which is arranged in the interior of a valve housing 3 where it can perform a linear switching over movement 4 as indicated by a double arrow in the direction of its longitudinal axis 5.

In the interior of the valve housing 3 an elongated recess 6 is formed, whose longitudinal axis 7 coincides with that (5) of the valve member 2. The valve member 2 is received in the recess 6.

The recess 6 has a middle portion 8 into which an outlet duct 12 of the valve housing 3 extending to an outlet A, which is accessible from the outside, opens. The middle portion 8 is adjoined axially on either side by a respective intermediate portion 13a and 13b, which is larger in cross section, of the recess 6, the transition between the middle portion 8 and each intermediate 13a and 13b being delimited by an axially orientated first passage 14a and 14b. Each of these two first passages 14a and 14b is surrounded by a first valve seat 15a and 15b axially facing the adjoining intermediate portion 13a and 13b, such seat being formed on the valve housing 3. The two first valve seats 15a and 15b face in mutually opposite directions in the axial direction of the longitudinal axis 7.

Each intermediate portion 13a and 13b is adjoined in the direction of the longitudinal axis 7 on the side opposite to the middle portion by a terminal portion 16a and 16b of the recess 6. The terminal portion 16a and 16b has, at least in the region directly adjoining an intermediate portion 13a and 13b, a larger cross section than the adjoining intermediate portion 13a and 13b so that an annular shoulder is formed, which defines an annular abutment face 17a and 17b facing the respective terminal portion 16a and 16b.

The one, first terminal portion 16a is permanently joined by way of a first input duct 18a with a first inlet E1 formed on the valve housing 3. In a similar fashion the opposite second terminal portion 16b communicates via a second input duct 18b with a second inlet E2, independent from the first inlet E1, on the valve housing 3.

In each of the second terminal portions 16a and 16b a passage member 23a (which is designed in a form separate both from the valve housing 3 and also from the valve member 2) having a second passage 22a and 22b extending through it axially, is arranged. Each passage member 23a and 23b is able to move in the direction of the switching over movement 4 in relation to the valve housing 3. In the present example it is guided for axial motion on the internal peripheral face 24 of the associated terminal portion 16a and 16b like a piston element. By way of an annular seal 25 arranged at its outer periphery each passage member 23a and 23b is sealed off by a sealing effect between it and the valve housing 3 irrespectively of the currently assumed axial position.

The passage member 23a and 23b is so disposed inside the terminal portion 16a and 16b that it always assumes a position between the adjacent intermediate portion 13a and 13b and the opening region of the input duct 18a and 18b opening into the associated terminal portion 16a and 16b. Accordingly each inlet E1 and E2 is joined, independently of the current position of sliding of the associated passage member 23a and 23b, with the second passage 22a and 22b axially extending through the passage member 23a and 23b.

The second passage 22a and 22b extends through the passage member 23a and 23b more especially centrally so that the latter is annular in form. It is arranged coaxially to the valve member 2, the valve member 2 being placed axially between the two passage members 23a and 23b.

Every second passage 22a and 22b is surrounded on the terminal side, facing the intermediate portion 13a and 13b, by a second valve seat 26a and 26b formed on the passage member 23a and 23b. The valve seat may therefore be shifted jointly with the associated passage member 23a and 23b in the direction of the switching over motion 4 in relation to the valve housing 3.

The valve member 2 is provided, in the regions lying within the intermediate portions 13a and 13b, with a respective closure disk 27a and 27b. These closure disks 27a and 27b are for example a ring element consisting of sealing material, and more particularly of rubber-like elastic material, which is attached to an elongated principal member 28 consisting for example of metal or a hard synthetic resin material, of the valve member 2 with a radial overlap. Each closure disk 27a and 27b has, at its opposite terminal faces, two sealing faces, which face away from each other, that is to say on the one hand a first sealing face 32a and 32b facing the first valve seat 15a and 15b and on the other hand a second sealing face 33a and 33b facing the second valve seat 26a and 26b. The two first sealing faces 32a and 32b are turned toward each other, whereas the second sealing faces 33a and 33b are turned away from each other in the direction of the switching over motion 4.

In each terminal portion 16a and 16b of the recess 6 stressing means 34a and 34b are accommodated, which respectively take effect between the valve housing 3 and the associated passage member 23a and 23b and urge the latter into a home position indicated for example in FIG. 1, in which the passage member 23a and 23b engages the abutment face 17a and 17b assigned to it. The stressing means 34a and 34b accordingly urge the passage member 23a and 23b respectively toward the valve member 2 against the associated abutment face 17a and 17b on the housing.

The stressing means 34a and 34b on each side are designed separately from one another. They stress the associated passage member 23a and 23b in a yielding manner applying a respective force $F_B$. Preferably the stressing means 34a and 34b are each H constituted by a respective mechanical compression spring means, as for example in the form of a helical compression spring, extending between the associated passage member 23a and 23b and a terminating wall 35a and 35b of the valve housing 3, said terminating wall 35a and 35b being axially opposite to the passage member 23a and 23b and hermetically sealing off the terminal portion 16a and 16b from the outside.

The level of the stressing force $F_B$ is dependent on the configuration of the compression spring means. If required adjustment means may be present, with which the biasing effect of the stressing means 34a and 34b can be varied in order to predetermine the stressing force $F_B$ as desired.

The stressing forces 34 $F_B$ exerted on the two passage members 23a and 23b by the two stressing members 34a and 34b are preferably equal in size.

In lieu of a mechanical compression spring means it would for example be possible also be possible to have a pneumatic spring means and in particular one based of a trapped volume of air.

The valve member 2 extends through the middle portion 8 and extends into the adjoining intermediate portions 13a and 13b and, in a corresponding switching position, will also extend some distance into the adjoining terminal portion 16a and 16b.

By way of the two inlets E1 and E2 a respective fluid medium may be supplied, the valve 1 preferably being operated with compressed air. Nevertheless other mediums may also be employed.

Via the respective input duct 18a and 18b, the following terminal portion 16a and 16b and the following second passage 22a and 22b the valve member 2 is acted upon on opposite sides respectively by the pressure medium supplied via the two inlets E1 and E2. The terminal working faces relevant here of the valve member 2 are equal in size and are indicated at 36a and 36b. The pressure medium supplied via the inlet E1 acts at a first input pressure $P_{E1}$ in the one actuating direction on the valve member 2, whereas the pressure medium supplied via the second inlet E2 acts with a second input pressure $P_{E2}$ in the opposite direction on the valve member 2.

The output pressure $P_a$ effective at the outlet A acts in both directions of actuations on the valve member 2, the areas subjected to it also be equal so that to this extent there is a pressure compensation.
As a consequence the respective switching position of the valve member 2 and therefore of the valve 1 is set by the input pressure difference between the first and the second input pressure $P_{E1}$ and $P_{E2}$. The valve member is acted upon in the direction of the lower input pressure by a dependent switching over force resulting from the input pressure difference.

The first and the second valve seats 15a and 15b and also 26a and 26b and in addition the first sealing faces 32a and 32b and the second sealing faces 33a and 33b are so matched in their design and arrangement that when one of the second sealing faces 33a or 33b engages the second valve seat 26a and 26b of a passage member 23a and 23b in its home position, all other sealing faces will be lifted clear of the respective valve seat associated with them. One of these two possible intermediate positions of the valve member 2 is indicated FIG. 2.

If a sufficiently high actuating force acts on the valve member 2, the latter may be shifted past the said intermediate position (FIG. 2) farther into a terminal position. This terminal position is defined by the first sealing face 32a or 32b, facing in the switching over direction, engaging the oppositely placed first valve seat 15a and 15b with the result that the associated first passage 14a and 14b is shut off. These terminal positions are furthermore characterized in that the valve member 2 has then shifted the passage member 23a and 23b, placed to the fore of it in the actuating direction, out of the home position against the actuating force $F_B$ acting on it. The displacement is caused by the second sealing face 33a or 33b, currently orientated in the actuating direction, such second sealing face 33a or 33b exerting a corresponding thrust force 37 on the opposite second valve seat 26a or 26b and consequently on the associated passage member 23a and 23b. The second passage 22a or 22b of the passage member 23a or 23b, thrust back by this, is then closed. The opposite force also responsible for the sealing action provides the stressing force $F_B$ acting on the passage member 23a and 23b.

Figure 3:
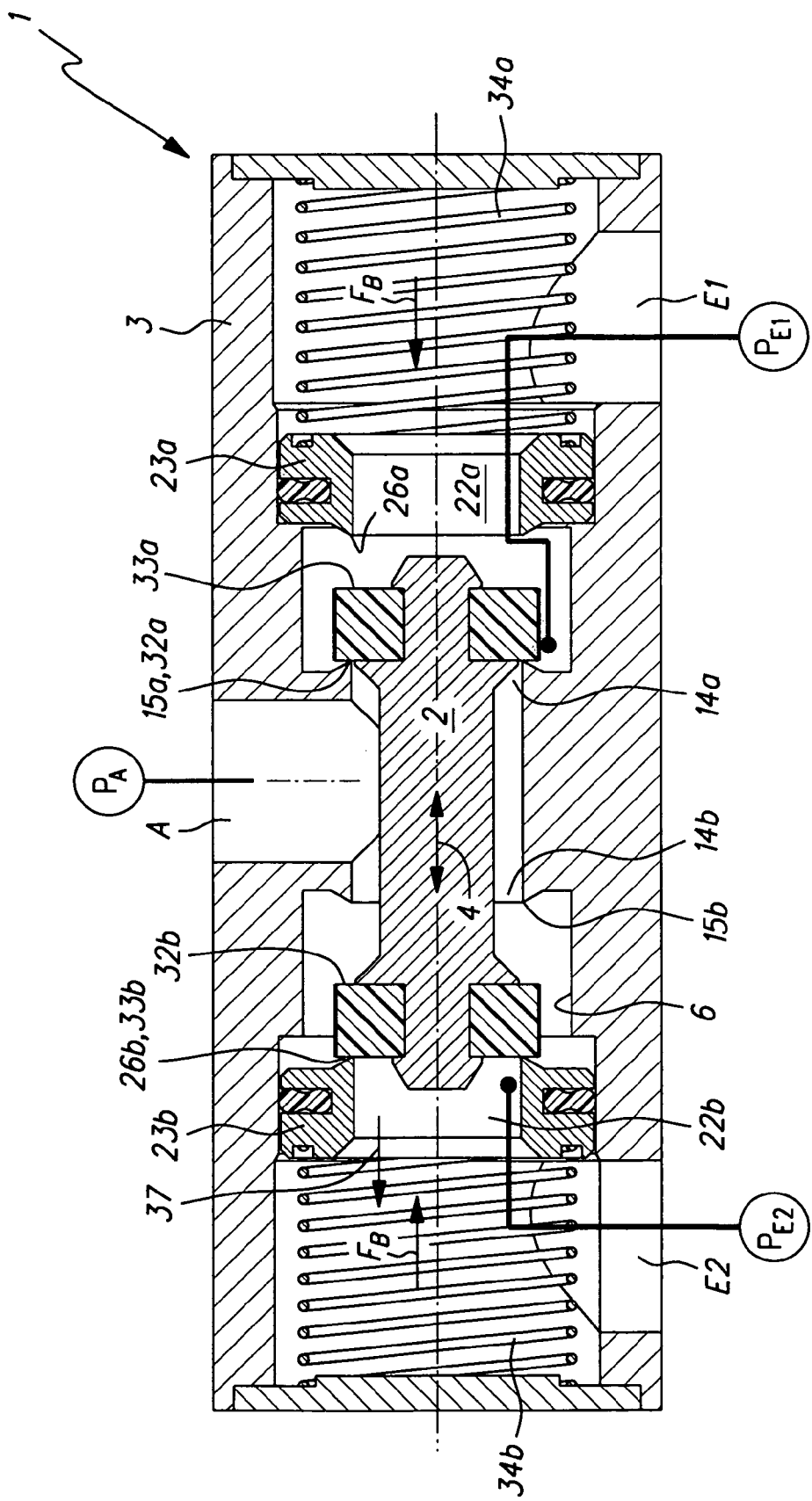
FIG. 3 shows a position of switching in which, owing to a pressure difference exceeding the threshold value, the valve member is shifted into one of its two possible terminal positions and accordingly the outlet is separated from the two inlets.

One of the two possible terminal settings of the valve member 2 is illustrated in FIG. 3.

In a preferred application the valve is employed as a safety valve or as a logical valve, which at the outlet A only leads to the output of a pressure medium supplied at the inlet when the pressure difference between the input pressures $P_{E1}$ and $P_{E1}$ simultaneously present at the two inlet E1 and E2 does not exceed a predetermined threshold value. On the pressure difference threshold value being exceeded the valve separates the outlet A both from the first inlet E1 and also from the second inlet E2.

The threshold value (responsible for the switching over characteristic of the valve) of the input side pressure difference is set by the stressing force $F_B$ of the stressing means 34a and 34b. The valve member 2 switches over into a terminal position separating the two inlets E1 and E2 from the outlet A, when the resulting actuating force acting on the valve member 2 on the basis of the input side pressure difference is larger than the stressing force $F_B$, acting in the opposite direction, of the one or the other stressing means 34a and 34b.

FIG. 1 shows an operating state with identical input pressures $P_{E1}$ and $P_{E2}$. The valve member 2 assumes in this case an indifferent switching position, which can vary, there being either a flow (indicated by the added flow arrows) simultaneously from both inlets E1 and E2 of the pressure medium to the outlet A or merely from one of the two inlets E1 or E2.

Figure 2:
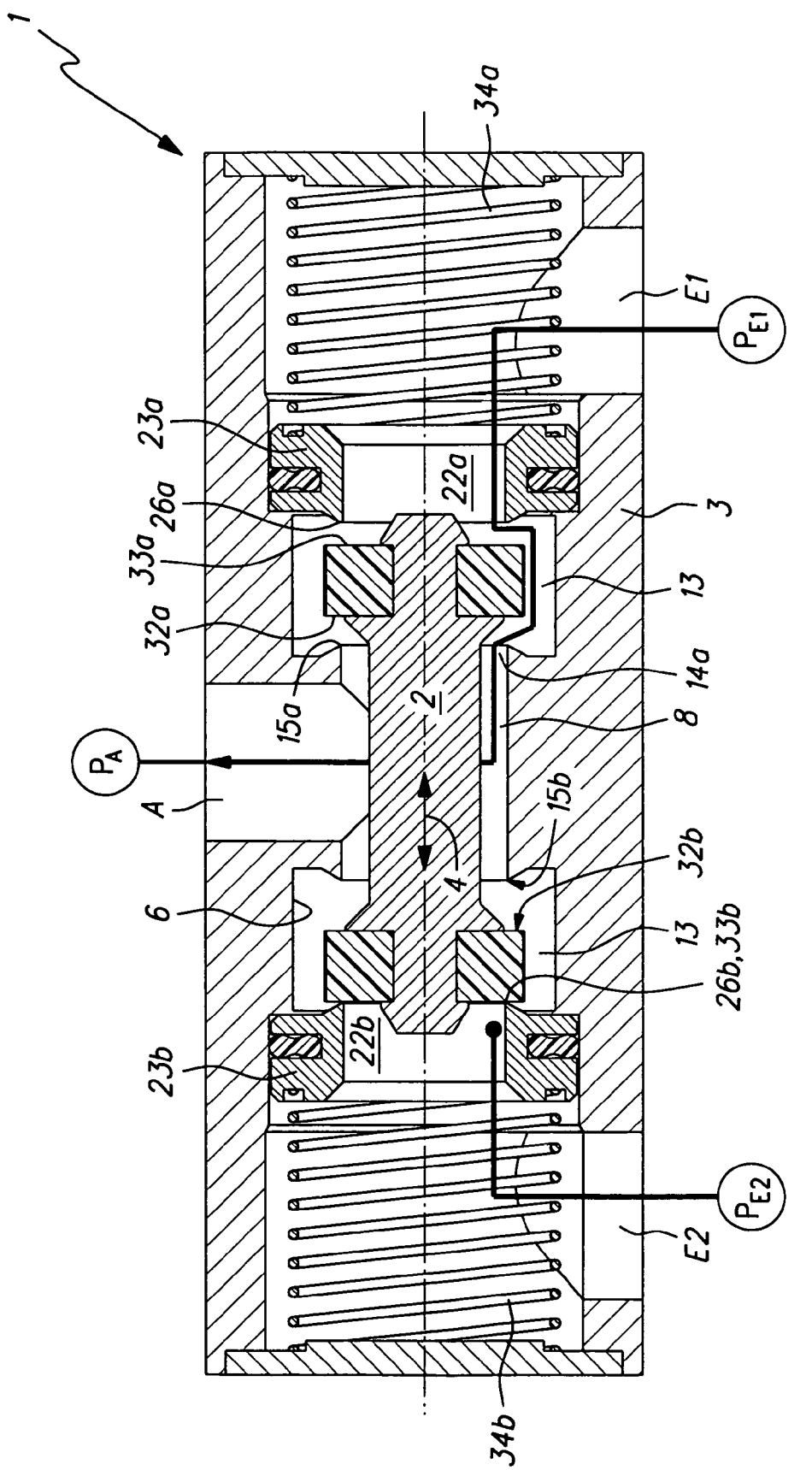
FIG. 2 shows the valve in s switching position, in which on the inlet side there is a pressure difference still below the threshold value and accordingly the outlet is connected with the inlet, which is at the higher pressure and is separated from the inlet at a lower pressure.

The outlet A is furthermore supplied with the higher of the two input pressures $P_{E1}$ and $P_{E2}$, when there is a pressure difference at the input, which has still not exceeded the set threshold value. Such an intermediate position is depicted in FIG. 2. Owing to the first input pressure $P_{E1}$, which is somewhat higher than the second input pressure $P_{E2}$, the valve member 2 will have turned off the second passage 22b of the passage member 23b (associated with the second inlet E2), and the first and second passages 14a and 22a (connected for fluid flow in series) simultaneously associated with the first inlet E1 are open in order to allow the passage of the first higher input pressure $P_{E1}$ to the outlet A.

In this intermediate position the valve member 2 bears against the passage member 23b (associated with the second inlet E2) which is fixed in its home position by the associated stressing means 34b.

If the input pressure difference exceeds the predetermined threshold value, the valve member 2 in accordance with FIG. 3 can force back the passage member 23b assigned to the lower input pressure $P_{E2}$ overcoming the stressing force $F_B$ stressing it. This displacement movement ends, when the valve member 2 abuts the first valve seat 15a. This means that both the first passage 14a is shut off and also the second passage 22b formed on the shifted passage member 23b is also shut off. Therefore the connection between the outlet A and each of the two inlets E1 and E2 is interrupted.

The manner of operation described is possible in either direction of movement of the valve member 2 and is only dependent on which of the two input pressures E1 and E2 is higher than the other one.

The valve 1 ensures that the outlet A is completely shut off from the inlets E1 and E2 on reaching an input side pressure difference of a predetermined size but that the outlet A is supplied with the higher of the two currently available input pressures until the threshold value is reached.

The invention claimed is:

1. A valve with an AND function in the case of which a valve member able to be shifted in relation to a valve housing controls the fluid connection between two inlets and an outlet, the switching position of the valve member being dependent on the pressure difference between the fluid pressure obtaining at the two inlets so that at equal input pressures at least one inlet is joined with the outlet, the valve member being able to assume two opposite terminal positions in which it respectively clears one of two first passages and simultaneously shuts off the other first passage, said first passages being connected with the outlet and being stationary in relation to the valve housing, wherein two second passages, connected with respectively one of the two inlets, are present which are respectively a component of one of two passage members able to move in relation to the valve housing in the actuating direction of the valve member, such passage members being so biased by stressing means independently of one another in a yielding manner into a home position that the valve member prior to reaching its terminal positions can bear, dependent on its actuation direction, on the one or the other passage member and thereby can close the second passage thereof so that the associated inlet is separated from the outlet, the level of the stressing force defining a threshold value for the inlet pressure difference and on exceeding said threshold value the valve member being able to force back the passage member, which is stressed and closed by the valve member, in order to shift itself into one of the terminal positions and accordingly to separate both inlets from the outlet.

2. The valve in accordance with claim 1, wherein the valve member has two mutually facing first sealing faces, respectively opposite a first valve seat arranged stationary in relation to the valve housing and defining one of the first passages, and in the two terminal positions of the valve member respectively one of the first sealing faces bears against the first valve seat facing it and the other first sealing face is lifted from the first valve seat facing it.

3. The valve in accordance with claim 2, wherein the valve member has two second sealing faces facing away from each other, opposite which there is respectively a second valve seat, on one of the passage members, such second valve seat defining one of the second passages so that on engagement of one of the second sealing faces with the second valve seat associated with it, the respectively other second sealing face is lifted from the second valve seat associated with it.

4. The valve in accordance with claim 3, wherein, respectively, a first sealing face and a second sealing face are disposed on mutually opposite terminal faces of two closure disks, spaced apart in the actuating direction, of the valve member.

5. The valve in accordance with claim 1, wherein, respectively, a first passage and a second passage are joined in series for fluid flow, the valve member being able to shut off respectively either the first passage or the second passage.

6. The valve in accordance with claim 1, wherein the home position of the passage members is defined by the valve member being able to bear against a passage member positioned in its home position with a shutting off of the second passage thereof without simultaneously closing the other second passage and the two first passages.

7. The valve in accordance with claim 1, wherein the home position of each passage member is defined by an abutment face stationary in relation to the valve housing, against which abutment face the passage member is urged by the stressing means.

8. The valve in accordance with claim 1, wherein the valve member is arranged axially between the two passage members.

9. The valve in accordance with claim 1, wherein the passage members are designed in an annular manner to form their second passage.

10. The valve in accordance with claim 1, wherein the passage members are arranged coaxially in relation to the valve member.

11. The valve in accordance with claim 1, wherein each passage member is arranged in the valve housing in a sliding fashion.

12. The valve in accordance with claim 1, wherein each passage member bears a seal by way of which it makes constant sealing contact with the valve housing.

13. The valve in accordance with claim 1, wherein the stressing means are each constituted by a compression spring means.

14. The valve in accordance with claim 1, wherein the valve housing has an elongated recess in which the valve member is arranged axially between the two passage members, the outer terminal portions of the recess lying on the side, which is axially opposite the valve member, communicating respectively with one of the two inlets and also accommodate the stressing means.

15. The valve in accordance with claim 2, wherein, a first passage and a second passage are joined in series for fluid flow, the valve member being able to shut off respectively either the first passage or the second passage.

16. The valve in accordance with claim 3, wherein, a first passage and a second passage are joined in series for fluid flow, the valve member being able to shut off respectively either the first passage or the second passage.

17. The valve in accordance with claim 4, wherein, a first passage and a second passage are joined in series for fluid flow, the valve member being able to shut off respectively either the first passage or the second passage.

18. The valve in accordance with claim 2, wherein the home position of the passage members is defined by the valve member being able to bear against a passage member positioned in its home position with a shutting off of the second passage thereof without simultaneously closing the other second passage and the two first passages.

19. The valve in accordance with claim 3, wherein the home position of the passage members is defined by the valve member being able to bear against a passage member positioned in its home position with a shutting off of the second passage thereof without simultaneously closing the other second passage and the two first passages.

20. The valve in accordance with claim 4, wherein the home position of the passage members is defined by the valve member being able to bear against a passage member positioned in its home position with a shutting off of the second passage thereof without simultaneously closing the other second passage and the two first passages.

* * * * *